US 10,837,360 B2

(12) United States Patent
Maier

(10) Patent No.: US 10,837,360 B2
(45) Date of Patent: Nov. 17, 2020

(54) SYSTEM FOR ENERGY STORAGE AND RECOVERY

(71) Applicant: Joseph Maier, Ravensburg (DE)

(72) Inventor: Joseph Maier, Ravensburg (DE)

(73) Assignee: Maxim Raskin, Piest'any (SK)

( * ) Notice: Subject to any disclaimer, the term of this patent is extended or adjusted under 35 U.S.C. 154(b) by 284 days.

(21) Appl. No.: 15/919,418

(22) Filed: Mar. 13, 2018

(65) Prior Publication Data

US 2019/0284995 A1 Sep. 19, 2019

(51) Int. Cl.
*F02C 6/16* (2006.01)
*F03B 13/06* (2006.01)
*H02J 15/00* (2006.01)
*F04B 41/02* (2006.01)
*H02P 9/42* (2006.01)
(Continued)

(52) U.S. Cl.
CPC ............... *F02C 6/16* (2013.01); *F03B 13/06* (2013.01); *F03B 15/14* (2013.01); *F04B 23/02* (2013.01); *F04B 41/02* (2013.01); *H02J 15/003* (2013.01); *H02J 15/006* (2013.01); *H02P 9/42* (2013.01); *F05B 2220/706* (2013.01); *F05B 2240/242* (2013.01); *F05B 2240/2411* (2013.01); *F05B 2260/42* (2013.01); *Y02E 10/20* (2013.01); *Y02E 60/16* (2013.01)

(58) Field of Classification Search
CPC ......... F03B 17/005; F03B 13/06; F03B 13/08
USPC ..................................................... 416/197 B
See application file for complete search history.

(56) References Cited

U.S. PATENT DOCUMENTS

| 4,806,781 A | 2/1989 | Hochstetter |
| 2012/0279209 A1 | 11/2012 | McBride et al. |
| 2016/0348637 A1 | 12/2016 | Bächli |

FOREIGN PATENT DOCUMENTS

| CH | 708 605 A2 | 3/2015 |
| DE | 27 17 679 A1 | 10/1978 |

(Continued)

OTHER PUBLICATIONS

DE 102014016491 machine translation to English from espacenet. (Year: 2016).*

(Continued)

*Primary Examiner* — Abiy Teka
*Assistant Examiner* — Michael Quandt
(74) *Attorney, Agent, or Firm* — Davis & Bujold PLLC; Michael J. Bujold

(57) ABSTRACT

The invention relates to a system for energy storage and recovery, comprising: at least one compressed-air tank, at least one pressurized-water tank in communication with the compressed-air tank, at least one turbine in effective communication with the at least one pressurized-water tank, a generator for generating electrical energy, a high-pressure pump for pumping water from a water reservoir into the pressurized-water tank. According to one aspect of the invention, the turbine in effective communication with the at least one pressurized-water tank is a reaction turbine, which is connected in series with a constant pressure turbine in such a manner that a drive shaft of the reaction turbine is connected to a drive shaft of the constant pressure turbine and a drive shaft of the generator, and the constant pressure turbine is arranged between the reaction turbine and the generator, wherein the generator includes an interface for connection to a public power grid.

13 Claims, 4 Drawing Sheets

(51) Int. Cl.
*F03B 15/14* (2006.01)
*F04B 23/02* (2006.01)

(56) References Cited

FOREIGN PATENT DOCUMENTS

| | | |
|---|---|---|
| DE | 601 18 987 T2 | 1/2007 |
| DE | 10 2011 082 726 A1 | 3/2013 |
| DE | 10 2013 112 196 A1 | 1/2014 |
| DE | 10 2013 018 741 A1 | 10/2014 |
| DE | 102014016491 A1 * | 5/2016 ............... F03G 7/00 |
| EP | 0 196 690 A1 | 10/1986 |
| EP | 0 230 636 A1 | 8/1987 |
| FR | 3 012 537 A1 | 5/2015 |
| WO | 2006/084748 A1 | 8/2006 |
| WO | 2011/101647 A2 | 8/2011 |

OTHER PUBLICATIONS

European Search Corresponding to EP 150 03 640 dated Nov. 9, 2016.

\* cited by examiner

SYSTEM FOR ENERGY STORAGE AND RECOVERY

FIELD OF THE INVENTION

The invention relates to a system for energy storage and recovery.

BACKGROUND OF THE INVENTION

New developments in the field of alternative energies, in particular those of discontinuous processes, such as solar energy or wind energy, have led to a situation where, on the one hand, there are periods of operation during which the generated energy often substantially exceeds the present demand, whereas on the other hand there are operating periods where the necessary and needed energy lacks completely or at least partially. These fluctuations have made the need for suitable storage means for surplus energy become more acute.

This is why development efforts have been focusing on processes allowing the electrical energy to be first converted to a different energy carrier from which it can then be recovered.

One of these processes is hydrolysis, whereby water is converted into its components oxygen and hydrogen. Due to the difficult handling of chemically active hydrogen and the generally huge effort required in terms of process technology, this method is not suitable for widespread use for electrical energy storage and recovery.

The storage of electrical energy in electric form has hitherto only been possible with the aid of storage batteries involving a transition from electrical to chemical processes. However, the development of devices having a high storage volume while maintaining a small structural volume has not yet been possible. These apparatuses have therefore not yet offered a suitable approach for the storage of large amounts of energy or the deployment of a large number of decentralized storage units.

Further methods are directed toward the utilization of the generated electrical energy to first perform work to fill storage facilities and to carry out recovery also via the performance of work. Such methods are used, for example, in pump storage powerplants, hydroelectric dams, hydropneumatic storage powerplants which are accommodated in disused caverns or mines. What is stored is often compressed air or natural gas or in combination with water which is sprayed into the gases for cooling.

The currently available energy storage means are far from sufficient for accommodating the fluctuations caused by renewable energy generators. At the same time, classic energy storage means, such as pump storage powerplants or hydroelectric dams are not sufficient and not easily implemented due to their environmental impact.

A method by which air is compressed and is used for recovering the energy in pneumatic or compressed-air motors, is described in DE 27 17 679 A. A drawback of such a method is the fact that air as an energy carrier for prime movers has a relatively low efficiency and is only efficient when it can be used in large quantities which, however, can hardly be generated in the conditions prevalent for energy storage.

A further method is shown by WO 2006/084748 A1. Herein, deformable or compressible parts are pressurized in water tanks and deformed. If energy is needed, water is removed, which is pressurized and can therefore drive machines. A drawback with this design is that the pressure at the consuming devices does not drop linearly with the water pressure in the reservoir and that such a design involves a lot of effort and cost.

A further storage method is shown in DE 601 18 987 T2. This method is suitable for small storage means, such as on vehicles. The method is not suitable for storage power plants which need a large storage volume.

DE 10 2011 082 726 A1 discloses designs for storage means. These pressure stores are not suitable for the construction of storage powerplants because of their cumbersome construction and the small storage volume.

DE 10 2013 112 196 A1 discloses a compressed-air storage powerplant. Compressed-air storage powerplants have poor efficiencies due to the physical conditions. Compressing a gas such as air always involves the production of a lot of heat. During expansion, the gas cools, which then has to be stored and recovered. The described combination between compressed-air tank and pressurized-water tank shows a practical approach. However, the described method involves the expansion of compressed air prior to the renewed filling of the water tank and renewed pressurization with fresh compressed air. This consumes a lot of energy for compressing the compressed air, leading to poor efficiency.

US 2012/0279209 A1 describes an apparatus operating under atmospheric conditions for pumping gas under high pressure into a pressure-resistant tank and then for letting it work in a stepwise fashion on liquids in closed hydraulic apparatus until it has expanded to atmospheric pressure. A drawback with this process is that for continuous repetition considerable energy needs to be expended for compressing the gas and for operating the hydraulic devices.

DE 10 2013 018 741 A1 discloses a system for energy storage and recovery for storing surplus energy present in a power grid by means of compressed air in a compressed-air tank. The energy is recovered by conducting the compressed air into a water tank resulting in the water being fed through a turbine and expanding. The generator driven by the turbine generates power which is fed to a power grid.

SUMMARY OF THE INVENTION

It is the object of the present invention to provide a system for energy storage and energy recovery which stores surplus energy in a public or non-public power grid and which can feed the energy back to the latter when energy is needed with high efficiencies and in an efficient manner.

The object is achieved with the systems according to the features of the independent claims. Advantageous embodiments of the invention are the subject matter of sub-claims.

According to a first aspect the invention provides a system for energy storage and recovery, in particular a powerplant comprising at least one compressed-air tank, at least one pressurized-water tank in communication with the compressed-air tank, at least one turbine in effective communication with the at least one pressurized-water tank, and a generator for generating electrical energy, a high-pressure pump for pumping water from a water reservoir into the pressurized-water tank. According to the present invention, the turbine in effective communication with the at least one pressurized-water tank is a reaction turbine, which is arranged in series with a constant pressure turbine in such a manner that a drive shaft of the reaction turbine is connected to a drive shaft of the constant pressure turbine and a drive shaft of the generator. The constant pressure turbine is arranged, according to the present invention, between the reaction turbine and the generator, wherein the generator includes an interface for connection to a public power grid.

The term effective communication is understood as meaning in the following, that the pressurized-water tank is directly connected to the turbine. This means that the water flowing out of the pressurized-water tank is fed directly to the turbine and drives it. The turbine in effective communication with the pressurized-water tank is thus not driven by another turbine. In other words, the reaction turbine is in effective communication with the pressurized-water tank and is driven by the outflow of water. The constant pressure turbine, on the other hand, is driven by the water flowing out of the reaction turbine.

The system according to the present invention achieves efficiencies of more than 75%, in particular more than 85%. These efficiencies can be achieved, in particular, at power outputs of more than 80 MW.

Since the reaction turbine, such as a Francis turbine, and the constant pressure turbine, such as a Pelton turbine, are connected to the generator via their drive shafts, there is a constant compensation between the reaction turbine and the constant pressure turbine in such a manner that the reduction in power of the reaction turbine due to the constant reduction in pressure is compensated by the constant pressure turbine. The energy stored in the pressure tanks can thus be optimally converted to electrical energy by the generator. The pressure reduction at the inlet of the reaction turbine is due to the reduction in pressure in the pressurized-water tank, when water is removed from the pressurized-water tank for generating energy.

The drive shaft of the reaction turbine and the drive shaft of the constant pressure turbine can form a common shaft. Or the drive shaft of the reaction turbine and the drive shaft of the constant pressure turbine can be connected by means of a rigid coupling. Or the drive shaft of the reaction turbine can be connected to the drive shaft of the constant pressure turbine via a transmission. It is also possible to provide an automatic clutch between the reaction turbine and the constant pressure turbine for disengaging the reaction turbine.

Advantageously, an outlet of the at least one pressurized-water tank is connected to an inlet of the reaction turbine and an outlet of the reaction turbine is connected to an inlet of the constant pressure turbine. This ensures that the energy stored in the pressurized water can be recovered in two stages, namely in a first stage, in which the water is conducted through the reaction turbine, and in a subsequent stage, in which water is fed through the constant pressure turbine after flowing through the reaction turbine.

The guide vanes of the reaction turbine can be used to regulate the exit pressure from the reaction turbine in such a manner that despite varying system pressures in the pressurized-water tank and therefore varying inlet pressures of the reaction turbine, the exit pressure from the reaction turbine and thus the inlet pressure of the constant pressure turbine can be held constant. The output power of the constant pressure turbine can be adjusted by means of adjustable inlet nozzles (guide vanes) to the required generator power. By adjusting the constant pressure turbine by means of inlet nozzles (guide vanes) the volume of water is adapted to the required output power and thus the power of the reaction turbine is indirectly adapted to the overall output power of the turbine combination by re-adjustment through its guide vanes. Advantageously, a means for pressure adjustment of the inlet pressure of the constant pressure turbine is arranged between an outlet of the reaction turbine and an inlet of the constant pressure turbine.

The reaction turbine is advantageously designed for inlet pressures between 10 and 1000 bar, in particular between 225 bar and 500 bar.

A second aspect of the invention is based on a system for energy storage and recovery, comprising at least one compressed-air tank, at least one pressurized-water tank in communication with the compressed-air tank, at least one turbine in effective communication with the at least one pressurized-water tank, a generator for generating electrical energy and a high-pressure pump for pumping water from a water reservoir into the pressurized-water tank. According to the present invention, the turbine in effective communication with the at least one pressurized-water tank, is a Pelton turbine, the generator is adapted for the generation of electric voltage, the generator is connected to a frequency converter for generating a constant voltage and frequency. The frequency converter includes an interface for connection to a public power grid.

The combination of a generator and a frequency converter according to the present invention ensures that despite the speed variations of the Pelton turbine caused by varying inlet pressures a constant voltage and frequency can be generated and fed to the public power grid. The invention is characterized in that the Pelton turbine is not operated as a constant pressure turbine with constant inlet pressures but with fluctuating inlet pressures. This leads to speed variations which in turn cause voltage fluctuations and frequency fluctuations in the generator. These voltage and frequency fluctuations are compensated according to the present invention by means of a frequency converter which is tuned to the generator. Despite the pressure fluctuations, a constant voltage and frequency are thus provided.

As already explained above, the fluctuating pressures at the inlet of the Pelton turbine are caused by the falling pressure in the pressurized-water tank, when water is removed from the pressurized-water tank for energy generation.

The system according to the present invention allows investment costs to be reduced and efficiencies of up to 95% to be achieved.

When a plurality of pressurized-water tanks is provided, a connection line can be present which interconnects the outlets of the pressurized-water tanks with each other, wherein the pressurized-water tanks are arranged with respect to each other in such a manner that the connection line has a gradient and is connected to the inlet of the turbine (for example immersion pipe) at its lowest point (for example sump, surge tank).

Precisely one pressure line can be present between an outlet of a compressed-air tank and an inlet of a pressurized-water tank, which is adapted to conduct compressed air from the pressurized-water tank to the compressed-air tank when energy is being stored and to conduct compressed air from the compressed-air tank to the pressurized-water tank when energy is being recovered. The line is designed in such a manner that should a compressed-air tank burst only a small volume can flow out and thus only a small supply of compressed air is necessary. A stop device can be arranged in the connection line between the compressed-air tank and the pressurized-water tank adapted to shut off the connection line at a sudden pressure drop. This ensures that should a compressed-air tank or pressurized-water tank burst, the entire stored compressed air cannot escape.

If a plurality of compressed-air tanks are provided, a connection line can be present, which connects the outlets of a plurality of compressed-air tanks with each other, wherein the plurality of compressed-air tanks are arranged with respect to each other in such a manner that the connection line has a gradient and is connected to an inlet of a pressurized-water tank at its lowest point. This ensures that any condensate arising in the compressed-air tanks flows through the connection line into the pressurized-water tank. It is thus possible to associate a plurality of compressed-air containers with a single pressurized-water tank. If the system also comprises a plurality of pressurized-water tanks, this ensures that should a compressed-air and/or a pressurized-water tank burst, the entire pressurized volume stored in the system cannot escape. In other words, in the present embodiment, the system according to the present invention comprises a plurality of groups of pressure vessels, wherein each group consists of a plurality of compressed-air tanks and a pressurized-water tank. If any group fails, the system can still access the other groups by shutting off the group in question by means of a sluice gate.

The compressed-air tank and the pressurized-water tank are connected to each other in such a manner that continuous pressure compensation occurs between the two tanks so that when energy is stored and also when energy is generated, the pressure in the two tanks is always compensated, i.e. there is a pressure equilibrium between the pressurized-water tank and the compressed-air tank. This means that on the one hand during the storage of energy, i.e. when water is fed to the pressurized-air tank, the pressure in the overall volume of the pressurized-water tank always rises, while on the other hand the pressure in the overall volume of the pressurized-water tank is always identical to the pressure in the compressed-air tank. On the one hand, during energy recovery, i.e. when water is removed from the pressurized-water tank, the pressure in the overall volume of the pressurized-water tank is always reduced, while on the other hand, the pressure in the overall volume of the pressurized-water tank is always identical to the pressure in the compressed-air tank. In particular, one compressed-air tank and one pressurized-water tank is connected by precisely one pressure line, which is configured to conduct compressed air from the pressurized-water tank to the compressed-air tank when energy is being stored and to conduct compressed air from the compressed-air tank to the pressurized-water tank when energy is being recovered. This pressure line has the function of letting compressed air flow from the compressed-air tank without pressure loss into the pressurized-water tank when energy is recovered. When energy is stored, this pressure line ensures that compressed air can flow from the pressurized-water tank into the compressed-air tank without pressure loss. A simple design is thus ensured.

A compressed-air turbine can be arranged between the compressed-air tank and the pressurized-water tank, in particular in the connection line between the compressed-air tank and the pressurized-water tank. This enables the additional recovery of energy when compressed air flows through the connection line, thus further improving and enhancing the efficiency of the system according to the present invention.

It is not known from the prior art to provide a pressure equilibrium between the compressed-air tank and the pressurized-water tank during the operation of the energy storage or recovery.

Furthermore, it should be noted that the present systems are both for energy storage and energy recovery. Of course, the present systems have an operating mode for each of these states, namely a first state for energy storage and a second state for energy recovery.

During energy storage, as will be described below, water is pumped by a high-pressure pump from a water reservoir into the pressurized-water tank, wherein the high-pressure pump is operated by means of surplus energy from a public or non-public power grid. The rising water level in the pressurized-water tank displaces the remaining compressed air in the pressurized-water tank to the connected compressed-air tank while pressure rises simultaneously due to the constant volume of the tanks. Due to the pressure compensation between the pressurized-water tank and the compressed-air tank, the pressure in the two tanks is always identical. This pressure rises as the water level rises in the pressurized-water tank continuously up to a predefinable maximum value.

During energy recovery, water from the pressurized-water tank is fed to the Pelton turbine, or the reaction turbine and the constant pressure turbine connected to it. A generator coupled to the drive shaft of the Pelton turbine or the common drive shaft of the reaction turbine and the constant pressure turbine generates energy which is fed to a connected public or non-public power grid. Due to the falling water level while the volume of the tanks remains constant, the pressure in the pressurized-water tank falls. Due to the pressure compensation between the pressurized-water tank and the compressed-air tank, the pressure in the two tanks is identical at any time. This pressure is continuously reduced up to a predefinable minimum value as the water level in the pressurized-water tank and the compressed-air tank falls.

The present system works with operating pressures of up to 500 bar. Choosing a suitable design for the pressure tanks (pressurized-water tank, compressed-air tank) enables even pressures of up to 1000 bar. This achieves a higher energy density which can be stored in a minimum amount of space. This enables output powers, for example, between 2 and 450 MW. By extending, i.e. enlarging, the compressed-air tank and the pressurized-water tank, any desired energy amounts can be stored at substantially reduced cost in comparison with the hitherto known storage systems. It is thus possible, for example, for the volume ratio between the pressurized-water tank and the compressed-air tank to be 1:1, 1:2, 1:3 or 1:4 or more.

The present system essentially works with recirculated water which expands through the Pelton turbine or through the series arrangement of the reaction turbine and the constant pressure turbine and is pumped back into the pressurized-water tank with the aid of high-pressure pumps. The system works with a small amount of supplemental air. Supplemental air can become necessary due to leakages in the pressure system and can be refilled in each tank as needed. The required amount is determined during the operation of the present system by the control unit and is supplied from a compressed-air reservoir.

A comparison unit can be provided for comparing the current pressure in the pressurized-water tank and/or the current pressure in the compressed-air tank and the current water level in the pressurized-water tank with a set pressure value. The comparison unit is configured in such a manner that as a function of the result of the comparison compressed air from the compressed-air reservoir (dash pot) is fed to the compressed-air tank. The air escaped due to leakage is thus compensated for by supplemental air. In particular, the compressed-air tank is connected to a compressor for pumping ambient air into the compressed-air reservoir. In other words, the compressed-air tank is filled with compressed air exclusively via an upstream compressed-air reservoir, which can be filled by a compressor.

Depending on the dimensioning of the system, the pressure in the compressed-air tank and the pressurized-water tank is built up once prior to initial operation of the storage powerplant with the aid of the compressor to a pressure of 50, 100, 200 or up to 1000 bar. After initial operation of the system, i.e. during the operating phase, in which the system is used as a powerplant for energy storage and energy recovery, the compressor is exclusively used for feeding compressed air into a compressed-air reservoir, which is upstream of the compressed-air tank and is only for the replacement of leakage air. The storage powerplant can thus be operated at pressures of 50, 100, 200 or up to 1000 bar.

A control unit may be present, which is configured to drive the high-pressure pump by means of power from the public power grid as a function of the load on the public or non-public power grid connected or connectable to the system to pump water from a water reservoir into the pressurized-water tank if surplus energy is present in the public power grid. Pressurized water is conducted from the pressurized-water tank to the turbine, and the power generated in the generator coupled to the turbine is fed into the public power grid when there is a demand for energy in the public power grid. With the present system, either surplus energy can be stored or stored energy can be made available within short reaction times.

Energy storage occurs without exception by recirculating the recirculation water with high-pressure pumps into the pressurized-water tanks. This process only uses surplus energy from the public power grid. The required compressed air is also generated only with surplus energy from the public power grid. The system according to the present invention can be powered up from 0 to 100% within about 65 seconds. Load reversals occur within seconds. The high-pressure pumps can be designed such that they can be powered up from standstill to 100% power within about 25 seconds. The volume of the compressed-air tank and the pressurized-water tank can be designed such that the system according to the present invention can supply full rated output power over a duration of up to four hours.

In this context, it is suggested that the control unit is configured for the case of energy recovery to regulate the power generated by the reaction turbine and/or the constant pressure turbine by opening or closing of the guide vanes (water inlet nozzles) connected to the reaction turbine and/or the constant pressure turbine.

The advantage of the present system is that it requires only little space and can be installed at any point near high voltage lines, wind parks, solar installations or industrial loads. Furthermore, the present system does not need any additional resources. For reasons of safety, it should be noted that the storage system according to the present invention, in particular the pressure tanks, are advantageously installed underground. In particular, the system according to the present invention can be installed on flat or inclined ground taking up a minimum amount of space. After installing the compressed-air and pressurized-water tanks in the ground, they are covered and the ground used again as green areas or agricultural land. The impact on the environment is thus minimal and resources are substantially saved in comparison to usual systems. By accommodating the water reservoir for receiving the expanded water from the turbine system beneath the building for housing the turbines, no additional surface area is needed for it. At the same time, the system is protected against contamination.

BRIEF DESCRIPTION OF THE DRAWINGS

The invention as well as further advantages of the invention will be described in the following with reference to figures, in which.

DETAILED DESCRIPTION OF THE PREFERRED EMBODIMENTS

Figure 1:
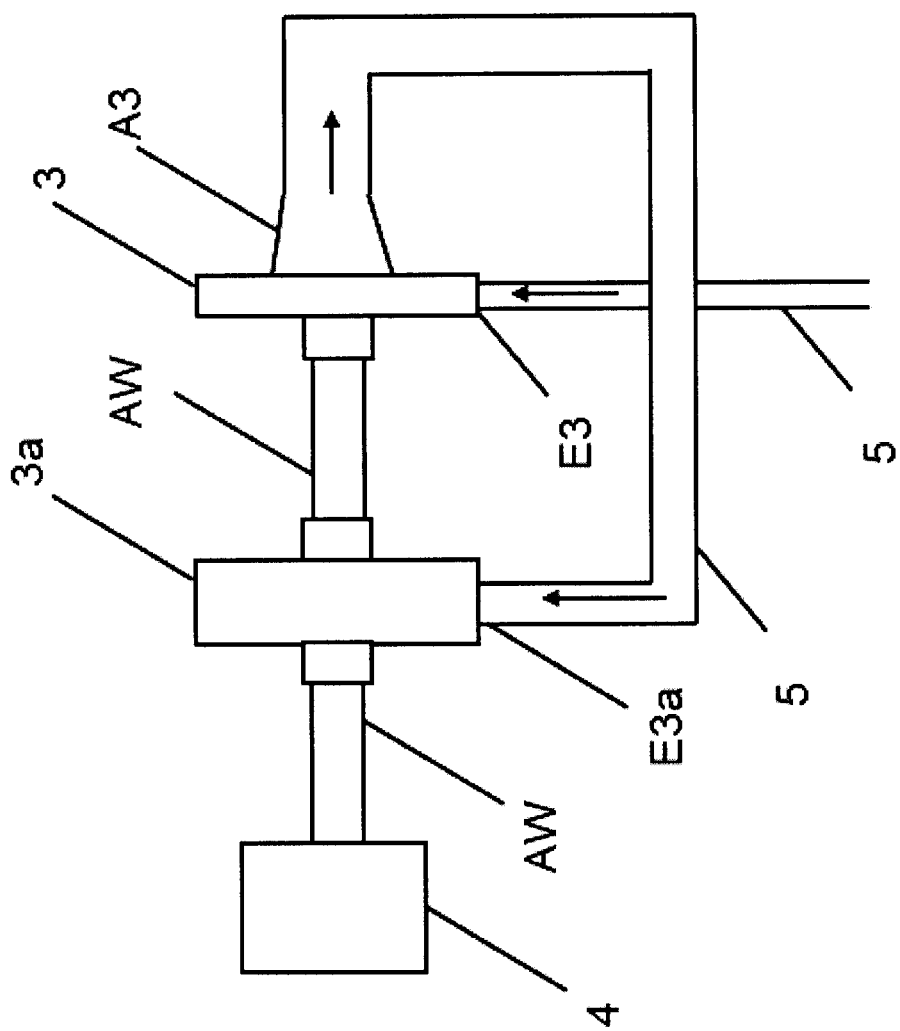
FIG. 1 shows the arrangement of a reaction turbine and a constant pressure turbine in a system for energy storage and recovery according to the present invention.
Figure 2:
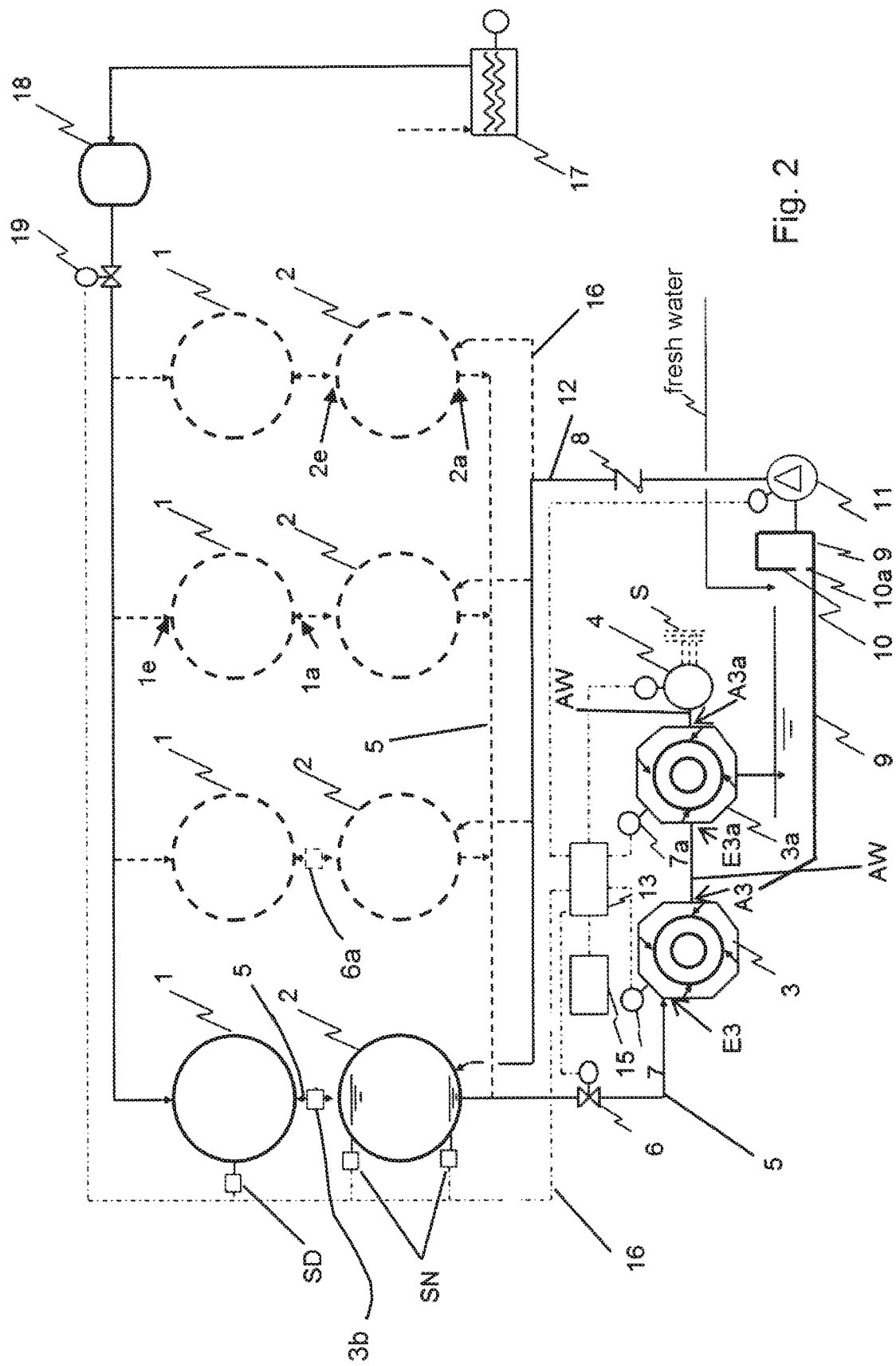
FIG. 2 shows a system for energy storage and recovery according to the present invention with a combination of a reaction turbine and a constant pressure turbine and, as an example, four compressed-air tanks and four pressurized-water tanks.
Figure 3:
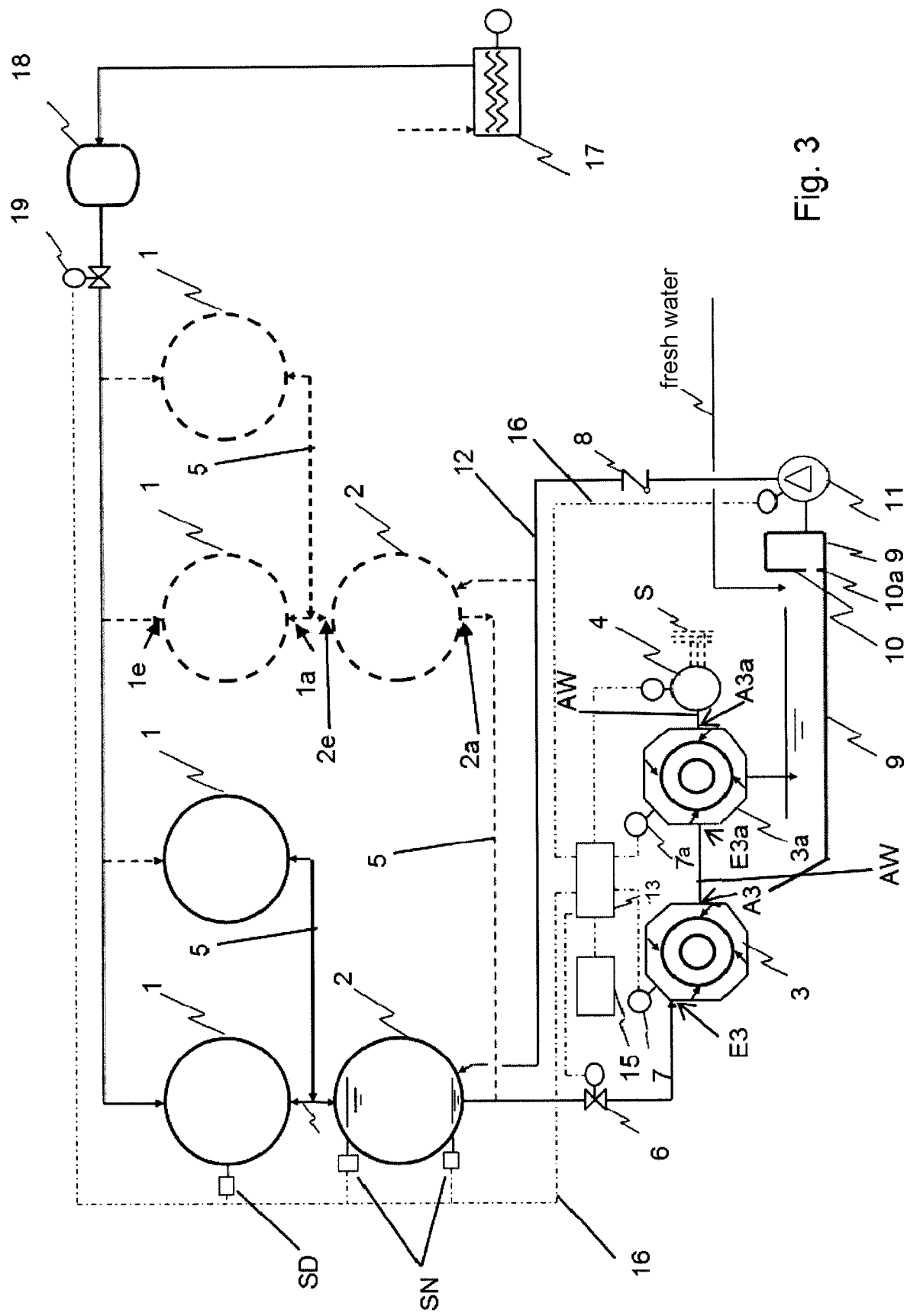
FIG. 3 shows a system for energy storage and recovery according to the present invention with, as an example, two groups each consisting of two compressed-air tanks and one pressurized-water tank.

FIG. 1 shows the arrangement according to the present invention of a reaction turbine 3 and a constant pressure turbine 3a in a system for energy storage and recovery according to the present invention. For clarity and for better understanding, FIG. 1 does not show the other components of the system for energy storage and recovery according to the present invention. Reference is therefore made to FIGS. 2 and 3.

The reaction turbine 3, for example a Francis turbine, comprises an inlet E3 and an outlet A3. The inlet E3 is connected to two pressurized-water tank(s) (not shown) via a pressure line 5. The outlet A3 of the reaction turbine 3 is connected to the inlet of a constant pressure turbine 3a, for example a Pelton turbine. The outlet (not shown) of the constant pressure turbine 3a is connected to a water reservoir for storing and capturing the water.

The drive shaft AW of the reaction turbine 3 is connected to the drive shaft AW of the constant pressure turbine 3a. A generator 4 for the generation of electrical energy is also coupled to the drive shaft AW. The drive shaft AW essentially extends centrally through the constant pressure turbine 3a. The drive shaft AW is, in particular, a one-piece drive shaft AW.

Arrows show the direction of flow of the water through the pressure line 5 to the inlet E3 of the reaction turbine 3, between the reaction turbine 3 and the constant pressure turbine 3a.

FIG. 2 shows a system for energy storage and recovery according to the present invention with a combination of a reaction turbine and a constant pressure turbine and, as an example, four compressed-air tanks 1 and four pressurized-water tanks 2. Each pressure tank 1, 2 is advantageously configured as a single-wall tank. Each tank 1, 2 can have a volume of up to 300,000 m$^3$ and can be rated for a pressure of up to 1000 bar.

Each compressed-air tank 1 comprises an inlet 1e for compressed air and an outlet 1a for compressed air. The inlet 1e of a compressed-air tank 1 is in communication with a compressed-air reservoir 18, which also has the function of a compressed-air compensation vessel. This compressed-air reservoir 18 is connected to the compressor 17 which can feed compressed ambient air to the compressed-air reservoir 18. The compressor 17 is supplied with power by a power grid S connected or connectable to the system. Refilling compressed air from the compressed-air reservoir 18 into a compressed-air tank 1 is carried out as needed, as will be explained below, as determined by a control and comparison unit 13.

The control and comparison unit 13 is connected to a flow control valve 19 via a data line 16. This flow control valve 19 is arranged between the compressed-air reservoir 18 and the compressed-air tank 1, in particular between the outlet of the compressed-air reservoir 18 and the inlet 1*e* of a compressed-air tank 1. FIG. 2 shows a single flow control valve 19, which is arranged upstream of the inlets 1*e* of the four compressed-air tanks 1. It goes without saying that it is also possible to arrange one flow control valve 19 at the inlet 1*e* of each compressed-air tank 1 for the individual control of each compressed-air tank 1. This ensures that during the operation of the system the pressure within the system can be held constant, such as at 500 bar. As will be explained below, the control and comparison unit 13 can be used to determine, on the basis of the water level within the pressurized-water tank determined by means of sensors SN, and the volume available in the compressed-air tank 1 and the pressurized-water tank 2, the amount of compressed air needed for a predetermined pressure, such as 500 bar, which can be refilled as necessary from the compressed-air reservoir 18 through the flow control valve 19 into the compressed-air tank 1. The sensor SD measures the pressure in a compressed-air tank 1. Sensors SD, SN are thus connected to the flow control valve 19 and the control and comparison unit 13 via corresponding data lines 16.

The outlet 1*a* of the compressed-air tank 1 is connected to the inlet 2*e* of the pressurized-water tank 2 via a pressure line 5. A stop device 6*a*, shown diagrammatically in FIG. 2, can be arranged in the pressure line between the compressed-air tank 1 and the pressurized-water tank 2 and configured to block the pressure line at a sudden pressure drop. A compressed-air turbine 3*b*, shown diagrammatically in FIG. 2, can be arranged between the outlet 1*a* of the compressed-air tank 1 and the inlet of the pressurized-water tank 2.

The outlet 2*a* of a pressurized-water tank 2 is connected to the inlet E3 of the reaction turbine 3 via a stop valve 6 and a pressure line 5. With respect to the arrangement of the reaction turbine 3 and the constant pressure turbine 3*a* reference is made to the explanations regarding FIG. 1. The outlets 2*a* of the pressurized-water tank 2 are always at the lowest point in the pressurized-water tanks 2. Furthermore, the outlets 2*a* of the pressurized-water tanks 2 are connected to each other by a common pressure line 5. This pressure line 5 has a gradient in the direction of the turbine arrangement 3, 3*a*.

The reaction turbine 3 and the constant pressure turbine 3*a* each have an adjustable set of guide vanes 7, 7*a*, to enable adjustment of the exit pressure from the reaction turbine 3 into the constant pressure turbine 3*a* and the inlet amount into the reaction turbine 3 and the constant pressure turbine 3*a*. By these means the output power of the turbine arrangement 3, 3*a* can be controlled. For this purpose, the inlet guide vanes 7, 7*a* are connected to the control and comparison unit 13 via a data line 16. The reaction turbine 3 and the constant pressure turbine 3*a* are coupled to the generator 4 for power generation via a common drive shaft AW. This generator 4 is connected to a power grid S or connectable to a power grid S.

The arrangement of the reaction turbine 3 and the constant pressure turbine 3*a* is configured in such a manner that in the case of energy recovery, water passing through the arrangement of the reaction turbine 3 and the constant pressure turbine 3*a* from the pressurized-water tank 2 is expanded into a water reservoir 9.

The water reservoir 9 has an antechamber 10 for extracting the water in the case of energy storage. This antechamber 10 has an opening 10*a* which is designed such that the lower edge of this inlet opening 10*a* is above the bottom of the antechamber 10. The top edge of the opening 10*a* is below the water level (not shown) in the water reservoir 9. The edge prevents heavy particles in the water from passing into the antechamber 10. By immersing the top edge below the minimum water level, air-containing water is prevented from entering the antechamber which can lead to malfunctions of the high-pressure pump 11 and soiling in the pressurized-water tank 2. The soiling can lead to malfunctions in the turbines 3, 3*a*. Furthermore, foam present as micro bubbles in the water created by the constant pressure turbine 3*a* due to water expansion is prevented from passing into the antechamber 10 and to the high-pressure pump 11.

A high-pressure pump 11 is connected to the antechamber 10. The high-pressure pump 11 pumps water from the antechamber 10 into the pressurized-water tank 2 via a connection line 12. The high-pressure pump 11 is supplied with power from the connected or connectable power grid S. Furthermore, a check valve 8 is provided in the connection line 12 between the high-pressure pump 11 and the pressurized-water tank 2. This check valve 8 is for preventing feedback to the high-pressure pump 11 caused by the pressure built up in the pressurized-water tank 2 during energy storage. It goes without saying that the pressurized-water tank 2 can have a stop valve (not shown) at the inlet 2*a* of the connection line 12 into the pressurized-water tank 2.

The system includes a control and comparison unit 13. This control and comparison unit 13 is connected to pressure sensors SD in the compressed-air tank 1 and level sensors SN in the pressurized-water tank 2 via a data line 16. The control and comparison unit 13 comprises a comparison means for comparing the current pressure in the pressurized-water tank 2, or the current pressure in the compressed-air tank 1 and the current water level in the pressurized-water tank 2 with a set pressure value. The control and comparison unit 13 is configured in such a manner that, as a function of the comparison result, compressed air from the compressed-air reservoir 18 is fed to the compressed-air tank 1 via a flow control valve 19.

The control and comparison unit 13 is connected to a network computer 15 of a connected or connectable public or non-public power grid S via a data line 16. The network computer 15 issues a request to the control and comparison unit 13 as to whether the system should or can be used for energy generation or for energy storage.

For this purpose, the control and comparison unit 13 is connected to the adjustable inlet guide vanes 7, 7*a* of the turbines 3, 3*a* via a data line 16. It is thus possible to adjust the power requested from the network computer 15 of the public power grid at the turbines 3, 3*a*. Furthermore, the control and comparison unit 13 is connected to the stop valve 6 via a data line 16. This ensures that the stop valve 6 is only opened in the case of energy recovery and a connection is established between the pressurized-water tank 2 and the turbines 3, 3*a*.

Furthermore, the control and comparison unit 13 is connected to a controller (not shown) of the high-pressure pump 11 via a data line 16. It is thus possible to convert the surplus energy made available to the system from the power grid S as needed to use it for pumping water into the pressurized-water tank 2.

FIG. 3 shows a system for energy storage and recovery according to the present invention with compressed-air and pressurized-water tanks arranged in groups. FIG. 3 shows, as an example, two groups each consisting of two compressed-air tanks and one pressurized-water tank.

To avoid undue repetition, reference is made to the description of FIGS. 1 and 2. In the system shown in FIG.

3, unlike FIG. 2, two compressed-air tanks 1 are connected to one pressurized-water tank 2. The outlets 1a of the two compressed-air tanks 1 are connected to the inlet 2e of a pressurized-water tank 2 via a pressure line 5. Two compressed-air tanks 1 and one pressurized-water tank 1 thus form one group (storage group). It goes without saying that a plurality of compressed-air tanks, or a plurality of pressurized-water tanks, could also be connected to form a group. The figure does not show stop valves which are present between the inlet 2e of a pressurized-water tank 2 and an outlet 1a of a compressed-air tank 1 within one group.

The pressurized-water tanks 2 of the groups are connected to the reaction turbine 3 at their outlets 2a (cf. explanations with respect to FIG. 1). Herein, the outlets 2a of the pressurized-water tanks are connected to each other via a pressure line 5, wherein the pressure line 5 has a gradient in the direction of the sump.

In the systems as shown in FIGS. 2 and 3, the required water is filled into the pressurized-water tank 2 prior to the initial operation of the system. Advantageously, initial filling of the pressurized-water tank 2 is carried out after filling the compressed-air tank(s) with compressed air. The required pressure in the compressed-air tanks 1, or the pressurized-water tank 2, is generated with the aid of the compressor 17 and filled into the compressed-air tank(s) 1 from the compressed-air reservoir 18. Depending on the required operating pressure, the pressure in the compressed-air tank 1 and thus in the pressurized-water tank 2 is increased to 10, 50, 100, 200 or 1000 bar.

The request for energy issued by the network computer of the power grid S causes the control and comparison unit 13 to open the stop valve 6 between the pressurized-water tank 2 and the turbines 3, 3a, thus causing the pressurized water in the pressurized-water tank 2 to be fed to the reaction turbine 3 and to the constant pressure turbine 3a coupled therewith. The amount of water flowing into the reaction turbine 3 is adjusted by the control and comparison unit 13. This is how the power generated by the reaction turbine 3 and the constant pressure turbine 3a is regulated. The generator 4 coupled to the reaction turbine 3 and the constant pressure turbine 3a generates the amount of energy requested by the network computer 15 of the power grid S and feeds it into the power grid S.

In this way it is possible for the control and comparison unit 13 to control the energy recovery and energy storage in the system. The control and comparison unit 13 receives instructions with respect to each phase of operation from the network computer 15 of the power grid S via corresponding data lines 16, as to whether the system is in the energy recovery or energy storage operating phase.

Figure 4:
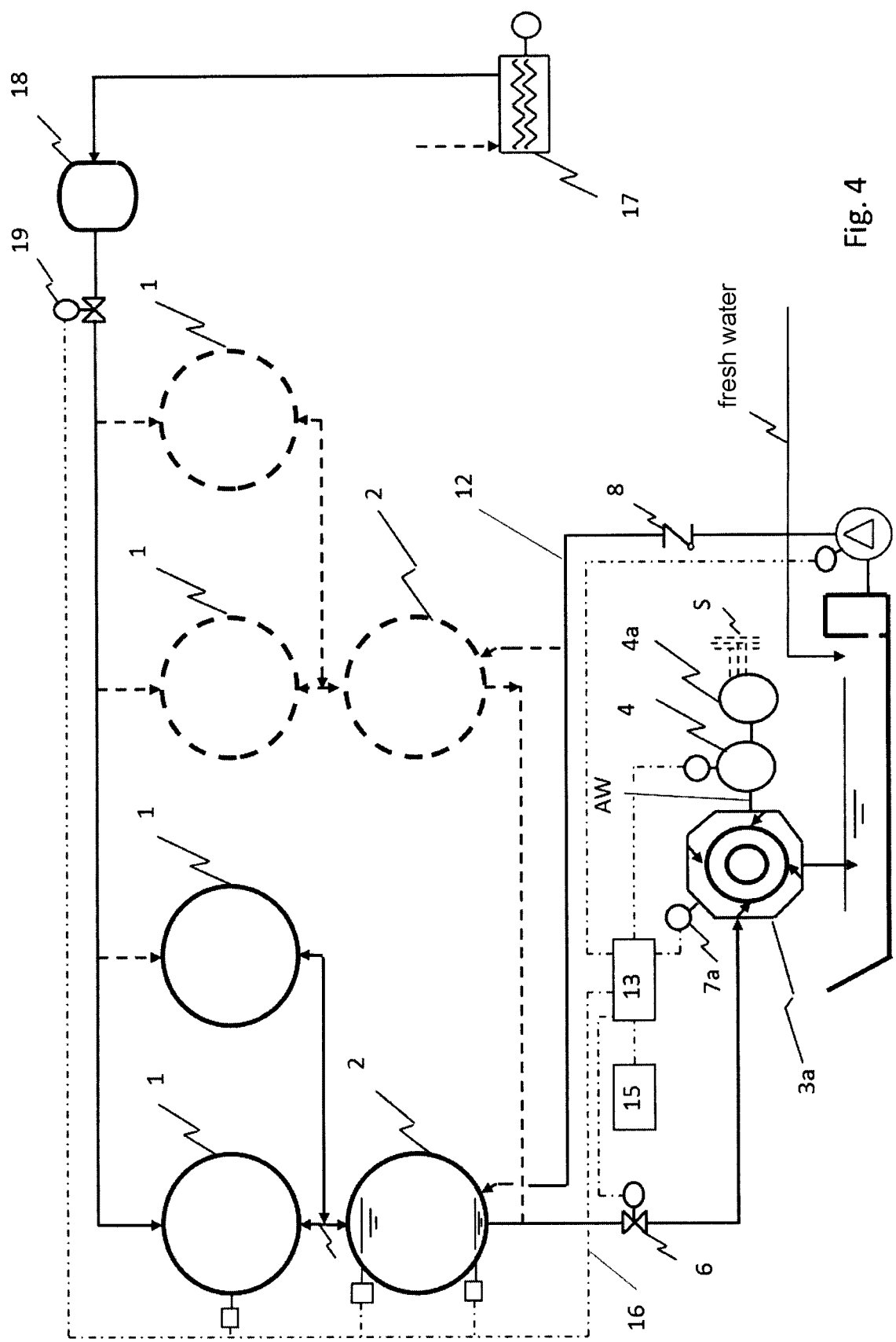
FIG. 4 shows a system for energy storage and recovery according to the present invention with a Pelton turbine and a frequency converter.

FIG. 4 shows a system for energy storage and recovery according to the present invention comprising a Pelton turbine and a frequency converter. FIG. 4 differs from the system described in FIG. 3 only in the arrangement of the turbine connected to the pressurized-water tank 2. In FIG. 4, a Pelton turbine 3a is connected to the pressurized-water tank 2. A generator 4 and a frequency converter 4a is connected to the drive shaft AW of the Pelton turbine 3a. The generator 4 is thus connected between the Pelton turbine 3a and the frequency converter 4a. The frequency converter 4a is connected to the public power grid S.

LIST OF REFERENCE NUMERALS 1 compressed-air tank
1e inlet
1a outlet
2 pressurized-water tank
2e inlet
2a outlet
3 reaction turbine
3a constant pressure turbine
E3 inlet of reaction turbine
A3 outlet of reaction turbine
E3a inlet of constant pressure turbine
A3a outlet of constant pressure turbine
AW drive shaft
4 generator
4a frequency converter
5 pressure line/connection line
6 stop valve
7 water inlet guide vanes
7a water inlet guide vanes
8 check valve
9 water reservoir
10 antechamber
10a opening
11 high-pressure pump
12 connection line
13 control and comparison unit
15 network computer
16 data line
17 compressor
18 compressed-air reservoir
19 stop valve
S power grid
SN level sensor
SD pressure sensor

The invention claimed is:

1. A system for energy storage and recovery, comprising:
at least one compressed-air tank (1),
at least one pressurized-water tank (2) in communication with the at least one compressed-air tank (1),
at least one turbine (3) in effective communication with the at least one pressurized-water tank (2),
a generator (4) for generating electrical energy, and
a high-pressure pump (11) for pumping water from a water reservoir (9) into the at least one pressurized-water tank (2), wherein
the at least one turbine (3) in effective communication with the at least one pressurized-water tank (2) is a reaction turbine, which is connected in series with a constant pressure turbine (3a) in such a manner that a drive shaft (AW) of the reaction turbine (3) is connected to a drive shaft (AW) of the constant pressure turbine (3a) and a drive shaft (AW) of the generator (4),
the constant pressure turbine (3a) is arranged between the reaction turbine (3) and the generator (4), and
the generator (4) includes an interface for connection to a public power grid (S).

2. The system according to claim 1, wherein the drive shaft of the reaction turbine (3) and the drive shaft (AW) of the constant pressure turbine (3a) form a common shaft, and, either, the drive shaft (AW) of the reaction turbine (3) and the drive shaft (AW) of the constant pressure turbine (3a) are rigidly coupled to each other, or the drive shaft (AW) of the reaction turbine (3) and the drive shaft (AW) of the constant pressure turbine (3a) are connected to each other via a transmission.
wherein an outlet of the at least one pressurized-water tank (2) is connected to an inlet of the reaction turbine (3) and an outlet of the reaction turbine (3) is connected to an inlet of the constant pressure turbine (3a).

3. The system according to claim 2, wherein pressure regulation of the inlet pressure of the constant pressure turbine (3a) is via a guide vane arranged between an outlet of the reaction turbine (3) and an inlet of the constant pressure turbine (3a).

4. The system according to claim 1, wherein when a plurality of pressurized-water tanks (2) are provided, a connection line connects outlets of the pressurized-water tanks (2) with one another, and the pressurized-water tanks (2) are arranged in such a manner with respect to one another that the connection line has a gradient and has a sump at a lowest point, which is connected to an inlet of the at least one turbine (3, 3a).

5. The system according to claim 1, wherein a stop valve (6) is provided at an inlet of the at least one turbine (3, 3a).

6. The system according to claim 1, wherein the at least one compressed-air tank (1) is in constant pressure equilibrium with the at least one pressurized-water tank (2), in such a manner that during energy storage and recovery the pressure in the at least one compressed-air tank (1) is equal to the pressure in the at least one pressurized-water tank (2).

7. The system according to claim 1, wherein precisely one pressure line (5) is present between an outlet of the at least one compressed-air tank (1) and an inlet of the at least one pressurized-water tank (2) and is adapted to conduct compressed air from the at least one pressurized-water tank (2) to the at least one compressed-air tank (1) during energy storage and to conduct compressed air from the at least one compressed-air tank (1) to the at least one pressurized-water tank (2) during energy recovery.

8. The system according to claim 7, wherein a stop device is arranged in the pressure line (5), which is configured to block the pressure line (5) at a sudden pressure drop.

9. The system according to claim 1, wherein the ratio of a volume of the at least one pressurized-water tank (2) to a volume of the at least one compressed-air tank (1) is 1:1, 1:2, 1:3, or 1:4.

10. The system according to claim 1, wherein a control and a comparison unit (13) is provided which is configured, as a function of the load on a public power grid (S), to drive the high-pressure pump (11) with energy from the public power grid (S) to pump water from the water reservoir (9) into the at least one pressurized-water tank (2) when there is a surplus of energy in the public power grid (S), or to conduct pressurized water from the at least one pressurized-water tank (2) to the at least one turbine (3, 3a) and to feed the energy generated in the generator (4, 4a) to the public power grid (S), when there is a demand for energy in the public power grid (S).

11. The system according to claim 10, wherein, in the case of energy recovery, the control unit (13) is configured to regulate the power generated by the at least one turbine (3, 3a) by opening or closing of water inlet nozzles (7) connected to the at least one turbine (3, 3a).

12. The system according to claim 1, wherein a control and a comparison unit (13) is provided for comparing a current pressure in the at least one pressurized-water tank (2) and a current pressure in the at least one compressed-air tank (1) and a current water level in the at least one pressurized-water tank (2) with a set pressure value, wherein the control and the comparison unit (13) is configured in such a manner that compressed air is fed from a compressed-air reservoir (18) to the at least one compressed-air tank (1) as a function of the comparison result.

13. A system for energy storage and recovery, comprising:
at least one compressed-air tank (1),
at least one pressurized-water tank (2) in communication with the at least one compressed-air tank (1),
a compressed-air turbine being arranged between the at least one compressed-air tank and the at least one pressurized-water tank (2),
a generator (4) for generating electrical energy, and
a high-pressure pump (11) for pumping water from a water reservoir (9) into the at least one pressurized-water tank (2), wherein
a constant pressure turbine (3a) in effective communication with the at least one pressurized-water tank (2) is a Pelton turbine,
the generator (4) is configured for the generation of electrical voltage,
the generator (4) is connected to a frequency converter (4a) for the generation of a constant voltage and frequency, and
the frequency converter (4a) includes an interface for connection to a public power grid (S).

* * * * *